Jan. 2, 1968  P. F. LIKAVEC  3,361,037
FAIL-SAFE PRESSURE RESPONSIVE DEVICE
Filed Oct. 21, 1965

INVENTOR.
PAUL F. LIKAVEC
BY
ATTORNEYS

United States Patent Office 3,361,037
Patented Jan. 2, 1968

3,361,037
FAIL-SAFE PRESSURE RESPONSIVE DEVICE
Paul F. Likavec, Detroit, Mich., assignor to Holley Carburetor Company, Warren, Mich., a corporation of Michigan
Filed Oct. 21, 1965, Ser. No. 499,847
3 Claims. (Cl. 92—37)

ABSTRACT OF THE DISCLOSURE

This application disclloses a fail-safe pressure sensing device including a housing, first and second individual bellows axially aligned in the housing and rigidly secured to opposite ends thereof, the adjacent movable ends of the first and second bellows being operatively connected to a member to function as a unit, the member including an output lever, the interior of the first bellows being evacuated to substantially absolute zero, the housing surrounding the first and second bellows being evacuated to a predetermined pressure only slightly above the pressure in the first bellows, on the order of 1 p.s.i.a., the interior of the second bellows being subjected to some externally applied pressure being sensed, whereby the force on the output lever will be closer to substantially the same if the second bellows fails at any ambient atmospheric pressure, or if the first bellows fails at any atmospheric pressure higher than the pressure in the housing, than if the housing were vented to atmosphere.

---

This invention relates generally to pressure responsive devices, and more particularly to a double bellows assembly arranged in a manner so that failure of one of the bellows does not result in total failure of the assembly to perform its intended function.

There are many bellows applications wherein failure of a bellows would be extremely detrimental or, at least, undesirable insofar as the operation of a mechanism embodying the bellows is concerned. For example, if an individual bellows incorporated in a compressor bleed mechanism of an aircraft gas turbine engine were to fail, depending upon the engine involved, there could be extremely detrimental results, unless the pilot noticed the problem and made manual adjustments therefor.

Accordingly, there is a need for a bellows assembly, wherein, should a particular bellows fail, an associated bellows will continue to function until the regularly scheduled overhaul, or at least until the aircraft is safely at its base, at which time the failure could be remedied.

Accordingly, a primary object of the invention is to provide a novel bellows assembly that continues to operate satisfactorily in spite of the failure of a particular bellows.

A further object of the invention is to provide such an assembly that includes two operatively connected bellows units, either of which will permit the overall mechanism to continue to operate satisfactorily should the other bellows fail for any reason.

A still further object of the invention is to provide such an assembly, wherein an indication of which of the two bellows has failed is possible through various tests, inasmuch as the bellows assembly itself is not readily disassembled.

Another object of the invention is to provide such an assembly wherein one of the two bellows is less likely to fail, thus greatly reducing the chance of both bellows failing simultaneously.

Figure 1:
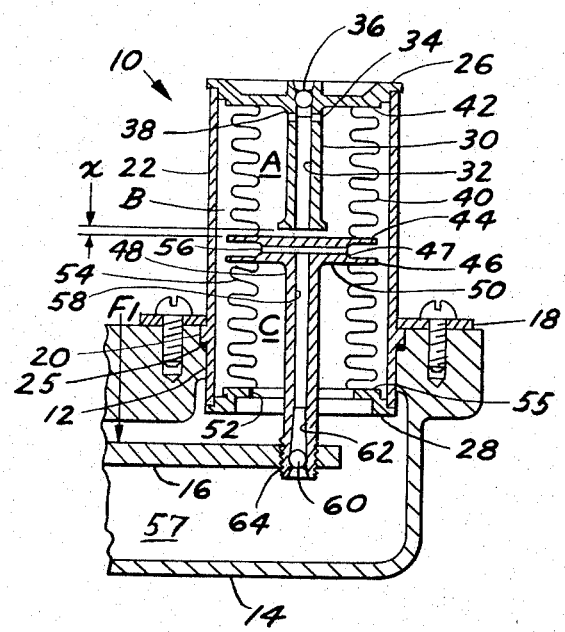
Figure 2:
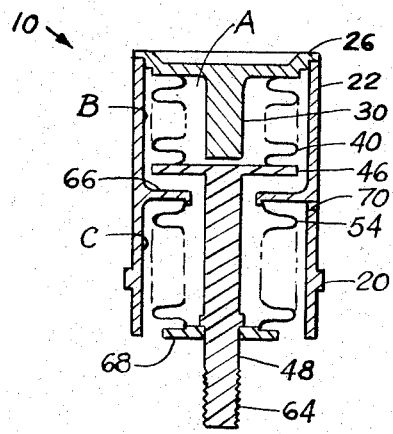

Other objects and advantages of the invention will become more apparent when reference is made to the following specification and the accompanying drawings wherein FIGURE 1 is a fragmentary cross-sectional view of a mechanism embodying the invention and FIGURE 2 is a modification thereof.

Referring now to FIGURE 1 in greater detail, a typical bellows assembly 10, as contemplated by the invention, is secured in an opening 12 formed in a housing 14, wherein some particular component, such as a lever 16, is operatively connected to the bellows assembly 10. A clamping mechanism such as a ring member 18 serves to hold the bellows assembly 10 in place in the opening 12, the ring 18 being clamped down upon a collar 20 formed on the housing 22 of the bellows assembly 10 by any suitable means, such as screws 24. A seal 25 may be inserted under the collar 20 to prevent leakage.

Top and bottom covers 26 and 28, respectively, are fastened on the ends of the cylindrical housing 22 by any suitable means such as brazing. The top cover includes a stem-like member 30 which extends downwardly in the figure toward the center of the housing 22. The purpose of the stem 30 is to prevent compression of the bellows 40 beyond its elastic limits or to an extent which would flatten out the usual rounded outer edges and thus destroy its operability. A passage 32 is formed through the axis of the stem 30 for a purpose which will be described later. Transverse openings 34 communicate between the passage 32 and the chamber A formed by the bellows. A ball plug 36 is fastened, such as by soldering, within a slightly tapered opening 38 formed at the inlet to the passage 32.

The bellows 40 is connected at its one end to the inside surface 42 of the cover 26 and at its other end to a face 44 of a circular member 46, the connections being such as to prevent leakage. The member 46 may include an external groove 47 to reduce weight, and a second stem member 48 extends from the opposing face 50 of the member 46, downwardly in the figure, away from the bellows 40 and the stem 30, through an opening 52 formed in the lower cover 28. A second bellows 54 is connected at its one end to the face 50 of the member 46 and at its other end to the inner surface 55 of the bottom cover 28 in a manner so that the opening 52 is aligned with the inner diameter of the bellows 54.

A diametrical passage 56 is formed through the mid-portion of the member 46, so that the ends thereof terminate at the groove 47. A passage 58 is formed through the axis of the stem member 48 so as to communicate between the radial passage 56 and the chamber 57. A second ball plug 60 is secured in the tapered inlet 62 of the passage 58 by any suitable means, such as soldering.

Theads 64 formed on the outer surface of the end of the stem 48 serve to permit the assembly 10 to be secured to a working member, such as the lever 16 of the mechanism, such as a gas turbine engine bleed control of which only the housing 14 is shown, embodying the invention. In other words, the assembly 10 is threadedly connected, through the stem 48, to the lever 16, prior to tightening down the clamps 18 on the collar 20.

OPERATION

In order to facilitate a better understanding of the invention, it is deemed desirable to describe the manner in which the bellows device 10 is evacuated. After the bellows units 40 and 54 have been secured to the top and bottom covers 26 and 28 and to the central member 46, and the top and bottom covers secured to the ends of the housing 22, as by brazing, and prior to the insertion of the ball plug 36, the assembly 10 is placed in a suitable vacuum chamber, whereby the vacuum in chamber A within the bellows 40 is reduced to substantially absolute zero. The ball plug 36 is then inserted in the opening 38 and soldered in place.

Prior to inserting the ball plug 60, the chamber B surrounding both the bellows units within the housing 22 is evacuated to a relatively low pressure, such as 1 p.s.i.a., through the open passages 62 and 56. The ball plug 60 is then dropped into the inlet 62 and secured therein by soldering. This can be performed remotely in the usual vacuum chamber. Due to the opening 52 in the bottom cover 28, the chamber C within the bellows 54 is at all times subjected to ambient pressure, this pressure, of course, varying downwardly from ambient pressure at sea level toward 0 p.s.i.a. at some extremely high altitude, in the case of aircraft applications. Alternatively, any other desired pressure may be supplied to the interior of bellows 54. As is obvious from the figure, the position of the lever 16 can be continually corrected for change in ambient pressure in the chamber C, due, for example, to altitude changes or the like, so long as the total downward forces, represented by $F_1$, are great enough to move surface 44 away from the stem 30.

There are various configuration possibilities within the scope of the invention, each capable of different predictable results, in event of failure, but the same operational characteristics until such time as a failure has occurred. The individual configurations are discussed below.

*Possibility I*

In this arrangement, the bellows units 40 and 54 are substantially equal in area. The force balance equation covering the system when both bellows units are operative would therefore be as follows:

$$(P_c-1)A_{54}+(1-0)A_{40}=K_T x+R$$

wherein $P_c$ is the ambient pressure within the chamber C, $A_{54}$ is the area of bellows 54, $A_{40}$ is the area of the bellows 40, $K_T$ is the total spring rate of the bellows units 40 and 54, $x$ is the distance between the lower end of the stem 30 and the upper surface 44 of the central member 46 when the assembly 10 is subjected to absolute zero pressure in chamber 57, and thus inside of bellows 34, and R is the so-called reactive force after the surface 44 is in contact with the stem 30. Inasmuch as $K_T x+R$ represents the total upward force which the stem 48 will exert on the lever 16, this variable force hereinafter will be designated F. Hence, $P_c A_{54}-A_{54}+A_{40}-0=F$. Since, $A_{54}=A_{40}$, the force balance equation reduces to $P_c A_{54}=F$ or $P_c A_{40}=F$.

It will now be assumed that the bellows 54 has failed. $P_c$ would then act directly upon the area $A_{40}$ of the bellows 40, since the pressure in chamber B becomes equal to $P_c$. Substituting accordingly:

$$(P_c-P_c)A_{54}+(P_c-0)A_{40}=F, \text{ or } P_c A_{40}=F$$

Since $A_{54}=A_{40}$, it is apparent that the resultant force balance equation is the same as that derived above for two operative bellows units and, therefore, no apparent indication of failure would be experienced, until such time as a scheduled overhaul was performed.

However, it is significant that the bellows unit 40 would very likely continue operating satisfactorily until the overhaul was performed. This is due in part to the fact that the bellows unit 40, prior to the failure of the bellows unit 54, had been subjected to a pressure differential of only 1 p.s.i.a. while undergoing movements within the distance $x$. It should be apparent that a bellows unit which is being subjected to a low pressure differential (1 p.s.i.a.) through a distance $x$ should have a longer life expectancy than a comparable bellows unit which is being subjected to a high pressure differential (13.7 p.s.i.a. at sea level) through the distance $x$.

In other words, one could expect the bellows 40 to have considerable usable life remaining after the failure of the bellows 54.

Now, assume that the bellows 40 has failed. In this event, the 1 p.s.i.a. pressure in chamber B will flow into chamber A. The resultant pressure in the larger volume of chambers A and B will, obviously, be less than 1 p.s.i.a. If the respective volumes of chambers A and B are selected to be in the ratio of, say, 1:2, the 1 p.s.i.a. pressure will be reduced to approximately .7 p.s.i.a. The resultant force balance equation will now become:

$$(P_c-.7)A_{54}+(.7-.7)A_{40}=F$$

or $$(P_c-.7)A_{54}=F$$

With such a force balance relationship, if the assembly 10 were then removed from the housing 14 and from the lever 16, and subjected to a standardized pressure test, the resultant ambient pressure vs. bellows assembly movement or force will shift to indicate that the bellows 40 had failed. In other words, the idea of the invention is that pre-planned bellows movements or forces at particular ambient or test pressures, indicate which of the two bellows, if any, has failed. Where the areas of the two bellows are equal, the above will indicate only whether the bellows 40 has failed. However, as will be seen from the discussions below, the bellows assembly can be constructed in a manner so that the pressure will indicate which of either of the two bellows has failed.

*Possibility II*

Assume now that the area of the bellows unit 54 is selected to be a predetermined amount greater than the area of the bellows unit 40, an area of .64 sq. in. for bellows 54 and an area of .60 sq. in. for bellows 40, for example.

For the sake of convenience, the three above mentioned possible force balance equations will again be listed:

(1) $(P_c-1)A_{54}+(1-0)A_{40}=F$, where both bellows are operable
(2) $(P_c-P_c)A_{54}+(P_c-0)A_{40}=F$, where bellows 54 has failed
(3) $(P_c-.7)A_{54}+(.7-.7)A_{40}=F$, where bellows 40 has failed Equation 1 then becomes $P_c A_{54}-A_{54}+A_{40}-0=F$ or $P_c A_{54}-(A_{54}-A_{40})=F$.

Letting $P_c=15$ p.s.i.a., $A_{54}=.64$ sq. in. and $A_{40}=.60$ sq. in. and substituting in the equation, the result becomes $15\times.64-(.04)=9.56$ lbs.

Now assuming that the bellows unit 54 has failed, the equation becomes $P_c A_{40}=F$. Substituting in Equation 2 above, the result is $15\times.60=9.00$ lbs.

Assuming that bellows unit 40 has failed, Equation 3 above becomes: $14.3\times.64=9.15$ lbs.

It is thus noted that approximately the same force is applied by the bellows assembly, regardless of whether it was the bellows 54 or the bellows 40 which had failed, the forces being 9.00 lbs. and 9.15 lbs., as compared to 9.54 lbs., where both bellows were operating. It would be obvious, however, that there had been a failure of one or the other of the two bellows units and, hence, a replacement assembly 10 would undoubtedly be substituted.

If it were important for any reason to be able to determine which of the bellows units had failed, then; in the manufacture of the assembly 10, the evacuated pressure in chamber B could be increased, or the area different between the bellows 40 and 54 could be increased, making the resultant shift, in the case where bellows 54 had failed, substantially lower than 9.15 lbs. For example, if the bellows 40 area were .58 sq. in., the second equation above would equal 8.74 lbs., making the 9.15 lbs. result exactly intermediate the 9.56 and 8.74 results. Hence, the particular failed bellows would be known.

*Possibility III*

Assume now that the area of the bellows unit 54 is selected to be a predetermined amount less than the area of the bellows unit 40. Using the same value for $P_c$ and the reverse areas, as compared to Possibility II, for $A_{54}$ and $A_{40}$, and substituting in the above three equations, when both bellows units are operable, the result would be $15 \times .60 - .60 + .64 = 9.04$ lbs.

When the bellows unit 54 has failed, Equation 2 becomes: $15 \times .64 = 9.6$ lbs.

When the bellows unit 40 has failed, Equation 3 becomes: $14.3 \times .60 = 8.6$ lbs.

It is apparent that when the bellows unit 40 has failed, the 8.6 lbs. force, as compared to 9.04 lbs. force, would indicate that that particular bellows unit has failed by the reduction in force. Now, should the bellows unit 54 fail, there would also be a definite indication that such failure had occurred by the increase in force to 9.6 lbs.

SUMMARY

If a particular application is such that no change whatsoever of the lever 16 can be tolerated in the event of a failure of either of the bellows units, then evacuation of chamber B to 0 p.s.i.a., rather than 1 p.s.i.a., and maintaining the areas of the bellows units substantially equal, will result in continued operation with no change on the lever 16 should one bellows unit fail. However, there would be no available indication that either of the bellows units had failed during normal operation, as would be available in the above examples.

As indicated above, if the pressures and/or relative areas of the bellows units are controlled, it can be determined, not only that one of the two bellows units had failed, but if necessary, exactly which unit has failed. Also, it should be apparent from the above discussion that the invention provides a novel bellows assembly having means for assuring that one of two bellows units will function to reflect external pressure changes should the other of the two units fail.

A modification of the bellows assembly is illustrated in FIGURE 2. The function and fail-safe results are substantially the same as those of FIGURE 1. The portion of the structure which may be identical to the structure of FIGURE 1 is identified by the same reference numerals, the differences being that the bellows 54 is connected at its upper end to an internal flange 66, and the lower end to a member 68 secured to the stem 48, forming a chamber C around the bellows unit 54, rather than inside thereof. An opening 70 is formed in the housing 22, adjacent the internal flange 66. It should be apparent to those skilled in the art how the above operation and formulas are applicable to the FIGURE 2 structure. While not illustrated, the FIGURE 2 structure could include passages 32, 56 and 58 for initial evacuation purposes, the same as in FIGURE 1. The FIGURE 2 structure is ideal for those applications wherein the assembly 10 must be mounted up-side-down. In this case, moisture, which may collect in the chamber C may drain out in the FIGURE 2 structure, whereas it could not do so in the FIGURE 1 structure.

While but two embodiments of the invention have been shown and described, it is apparent that other modifications of the invention are possible within the scope of the appended claims.

What I claim as my invention is:

1. A fail-safe pressure sensing device, comprising a sealed rigid housing, first and second individual bellows aligned in said housing with one end of each bellows rigidly secured to opposite ends thereof, a member disposed between the ends of said housing and secured at its opposite sides to the adjacent movable ends of said first and second bellows, said member being operatively disconnected from said housing and movable in response to expansion and contraction of said bellows and an output lever means connected to said member, the interior of said second bellows being evacuated to substantially absolute zero, the interior of said first bellows being subjected to the external pressure being sensed, and the volume surrounding said first and second bellows and bounded by a wall of said sealed housing being evacuated to a predetermined pressure value only slightly above absolute zero, on the order of 1 p.s.i.a., whereby failure of said first bellows at any ambient atmospheric pressure or failure of said second bellows at atmospheric pressures above the pressure in said housing results in a pressure sense that is closer to being substantially identical to that originally intended than if said housing were vented to atmosphere.

2. A fail-safe pressure sensing device, comprising a sealed outer casing with one closed and one open end, a first and second bellows within said outer casing, said first bellows being rigidly secured to said closed end and extending toward said open end, said second bellows being rigidly secured to said housing at substantially the midpoint between said open end and said closed end and extending toward said open end, a member within said outer casing and being secured to the movable ends of said first and second bellows, said member being operatively disconnected from said housing and movable in response to the expansion and contraction of said bellows, an output lever means connected to said member, the interior of said first bellows being evacuated to substantially absolute zero, the exterior of said second bellows being subjected to the exterior pressure being sensed, and the volume surrounding said first bellows and within said second bellows and bounded by a wall of said sealed casing being evacuated to a pressure a pretermined value above absolute zero.

3. A fail-safe pressure sensing device, comprising a sealed housing, first and second end covers for said housing, first and second bellows fixedly secured at their opposite ends to said first and second end covers, respectively, a member located near the center of said housing and being secured at its opposite faces to the adjacent ends of said first and second bellows, said member being operatively disconnected from said housing and movable in response to the expansion and contraction of said bellows, a transverse passage through said member, a stop member extending from said first cover into said first bellows and serving to limit movement of said member toward said first cover, a first passage through the axis of said stop member, a first plug in the end of said passage nearer to said first cover, an opening formed in said second cover, a stem extending from said member through said second bellows and said opening, a second passage through the axis of said stem and intersecting said transverse passage, a second plug in the end of said second passage opposite said transverse passage, the interior of said first bellows being evacuated to substantially absolute zero pressure, the space between the outer surfaces of said first and second bellows and the inner surfaces of said housing being evacuated to a predetermined pressure, and the interior of said second bellows being subjected to the externally applied pressure being sensed.

References Cited

UNITED STATES PATENTS

| | | | |
|---|---|---|---|
| 2,072,617 | 3/1937 | Cate | 92—43 |
| 2,477,233 | 7/1949 | Bristol | 92—39 X |
| 2,618,286 | 11/1952 | Johnson | 92—49 X |
| 2,674,268 | 4/1954 | Kimm | 92—40 X |
| 2,897,650 | 8/1959 | Carlson et al. | 92—40 X |
| 2,965,137 | 12/1960 | Leeson et al. | 92—37 |
| 3,034,534 | 5/1962 | Gustafsson | 92—39 |
| 3,073,348 | 1/1963 | Allen | 92—39 |
| 3,074,435 | 1/1963 | Woestemeyer | 92—39 X |
| 3,092,821 | 6/1963 | Muehlner | 92—38 X |
| 3,094,839 | 6/1963 | Kinney | 92—39 X |

EDGAR W. GEOHEGAN, *Primary Examiner.*

MARTIN P. SCHWADRON, *Examiner.*

I. C. COHEN, *Assistant Examiner.*